United States Patent
Yu et al.

(10) Patent No.: US 10,235,784 B2
(45) Date of Patent: Mar. 19, 2019

(54) COLOR SYNCHRONIZATION ACROSS A STORY

(71) Applicant: SAP SE, Walldorf (DE)

(72) Inventors: Jie Yu, Port Moody (CA); Sarah Menard, Vancouver (CA); Tianhan Zhang, Vancouver (CA); Guang Yang, Vancouver (CA)

(73) Assignee: SAP SE, Walldorf (DE)

(*) Notice: Subject to any disclaimer, the term of this patent is extended or adjusted under 35 U.S.C. 154(b) by 92 days.

(21) Appl. No.: 15/389,114

(22) Filed: Dec. 22, 2016

(65) Prior Publication Data

US 2018/0182139 A1    Jun. 28, 2018

(51) Int. Cl.
*G06T 11/40* (2006.01)
*G06T 11/20* (2006.01)

(52) U.S. Cl.
CPC ............ *G06T 11/40* (2013.01); *G06T 11/206* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,847,717 A | * | 12/1998 | Berry | ........................ G06T 1/00 345/506 |
| 6,211,887 B1 | * | 4/2001 | Meier | ................... G06F 17/246 345/440 |
| 6,496,832 B2 | * | 12/2002 | Chi | ........................ G06F 17/246 |
| 6,529,900 B1 | * | 3/2003 | Patterson | ........... G06F 17/30572 |
| 6,990,238 B1 | * | 1/2006 | Saffer | ............... G06F 17/30716 382/224 |
| 9,239,672 B2 | * | 1/2016 | Kraut | ..................... G06F 3/0488 |
| 9,891,801 B2 | * | 2/2018 | Roesch | ............... G06F 3/04847 |
| 2006/0112070 A1 | * | 5/2006 | Ramos | ............. G06F 17/30554 |
| 2007/0211056 A1 | * | 9/2007 | Chakraborty | ......... G06T 11/206 345/440 |
| 2015/0324101 A1 | * | 11/2015 | Roesch | ............... G06F 3/04847 715/771 |

* cited by examiner

Primary Examiner — Tsung Yin Tsai
(74) Attorney, Agent, or Firm — Buckley, Maschoff & Talwalkar LLC (57) ABSTRACT

A system, method, and computer-readable medium to receive a request to render a visualization, the visualization being defined by at least one dimension of a data set and being one of multiple visualizations belonging to a story; determine whether the at least one dimension of the visualization has a color assigned thereto; automatically assign, in an instance the at least one dimension of the visualization lacks a color assignment, a color to the at least one dimension of the visualization; store the color assigned to the at least one dimension in a color synchronization map; render, in response to the request, all visualizations in the story with the at least one dimension in the color assigned thereto in the color synchronization map.

17 Claims, 7 Drawing Sheets

```
┌─────────────────────────────────────────────────────────┐
│  RECEIVE A REQUEST TO RENDER A VISUALIZATION,           │
│  THE VISUALIZATION BEING DEFINED BY AT LEAST ONE        │
│  DIMENSION OF A DATA SET AND BEING ONE OF               │
│  MULTIPLE VISUALIZATIONS BELONGING TO A STORY           │
│                                                     405 │
└─────────────────────────────────────────────────────────┘
                            │
                            ▼
┌─────────────────────────────────────────────────────────┐
│  DETERMINE WHETHER THE AT LEAST ONE DIMENSION OF        │
│  THE VISUALIZATION HAS A COLOR ASSIGNED THERETO         │
│                                                     410 │
└─────────────────────────────────────────────────────────┘
                            │
                            ▼
┌─────────────────────────────────────────────────────────┐
│  AUTOMATICALLY ASSIGN, IN AN INSTANCE THE AT LEAST      │
│  ONE DIMENSION OF THE VISUALIZATION LACKS A COLOR       │
│  ASSIGNMENT, A COLOR TO THE AT LEAST ONE DIMENSION      │
│  OF THE VISUALIZATION                                   │
│                                                     415 │
└─────────────────────────────────────────────────────────┘
                            │
                            ▼
┌─────────────────────────────────────────────────────────┐
│  STORE THE COLOR ASSIGNED TO THE AT LEAST ONE DIMENSION │
│  IN A COLOR SYNCHRONIZATION MAP                         │
│                                                     420 │
└─────────────────────────────────────────────────────────┘
                            │
                            ▼
┌─────────────────────────────────────────────────────────┐
│  RENDER, IN RESPONSE TO THE REQUEST, ALL VISUALIZATIONS │
│  IN THE STORY WITH THE AT LEAST ONE DIMENSION IN THE    │
│  COLOR ASSIGNED THERETO IN THE COLOR SYNCHRONIZATION MAP│
│                                                     425 │
└─────────────────────────────────────────────────────────┘
```

COLOR SYNCHRONIZATION ACROSS A STORY

BACKGROUND

Enterprise software systems receive, generate, and store data related to many aspects of an enterprise. Reporting tools may access the data and present the data in a variety of graphic visualizations, including different types and formats of graphs. The visualizations might be used by consumers thereof to gain insights into the operations of the enterprise and/or other purposes.

The data may be represented by different data structures (e.g., objects) that may be classified as measures (e.g., revenue, taxes) having values that can be used in calculations, and dimensions (e.g., year, country) defining categories into which the measures can be filtered, grouped, and labeled for analysis and reporting.

Content creators may define visualizations to include presentations of values of one or more measures of the enterprise's data arranged according to various dimensions of the data, where the created visualizations may subsequently be consumed by one or more content consumers. Conventionally, content creators might create visualizations with a focus on including the desired dimensions and measures (i.e., content) in the visualizations. The particular manner in which the visualizations are presented for consumption might not be done in a consistent manner. In some scenarios, different visualizations might render the same dimensions differently, even in some contexts where the different visualizations are related or associated with each other in some regard. For example, two related visualizations (Chart 1, Chart 2) including the dimension of a country might have the same dimension (e.g., Country=U.S.) rendered differently in the two visualizations (e.g., in Chart 1 a bar graph representation for a value in the U.S. might be red while Chart 2 presents a bar graph representation for a value in the U.S. in blue and a value corresponding to the country of China in red). Such variation in the rendered presentation of the dimensions may very well introduce confusion, or at least reduce the clarity, of rendered visualizations.

Conventional reporting tools provide many types of visualizations for graphically presenting values of one or more measures. However, more efficient systems and methods are desired to generate consistent visualizations.

DETAILED DESCRIPTION

The following description is provided to enable any person in the art to make and use the described embodiments. Various modifications, however, will remain readily apparent to those in the art.

In some example contexts, use-cases, and embodiments, one or more terms will be used in the present disclosure. As a matter of introduction and to ease the understanding of the present disclosure, a number of terms will be introduced, where the full meaning of the following terms will be further understood in context of the disclosure herein, on the whole.

Figure 1:
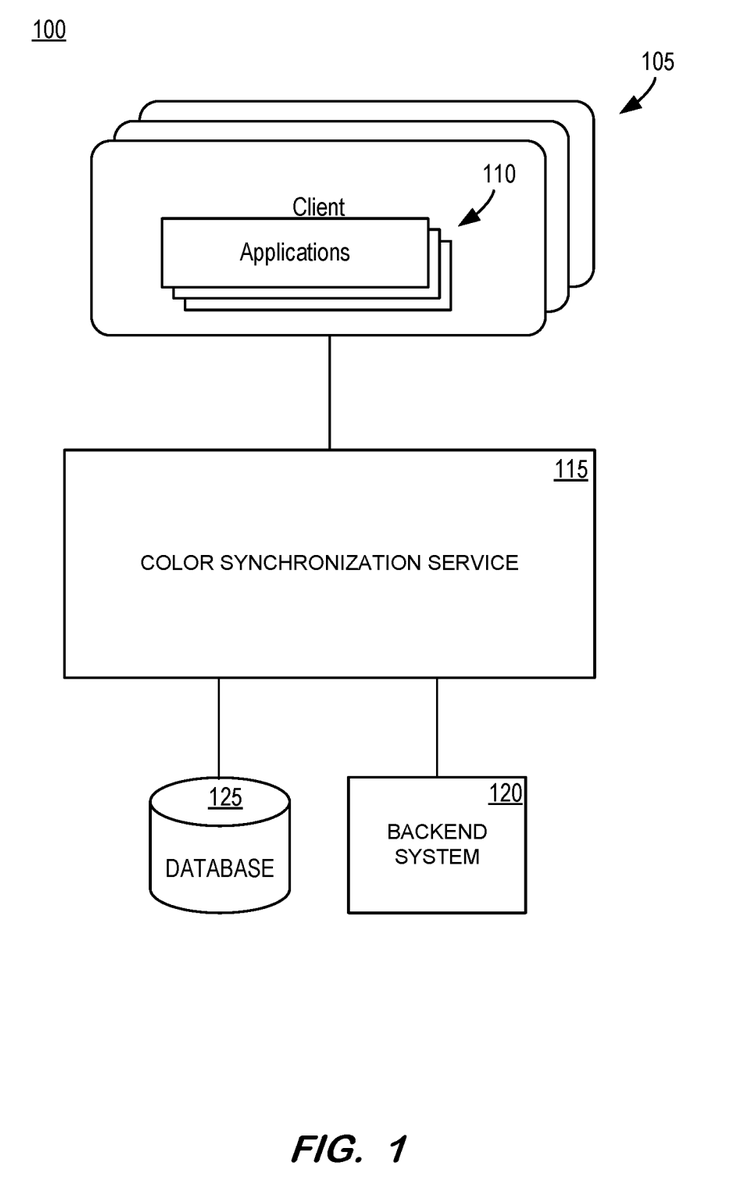
FIG. 1 is an example block diagram of a system architecture.

FIG. 1 is an illustrative block diagram of an architecture or system 100, in one example. Examples of some embodiments of the present disclosure are not limited to the particular architecture 100 shown in FIG. 1. System 100 includes one or more client devices 105 running one or more applications 110. Applications 110 may, in some embodiments, include a suite of different software applications having, at least to some extent, related functionality, similar user interfaces, and some ability to exchange data with each other. Applications 110 may include different software applications that support the operations and process of an organization. In some embodiments, one of the applications 110 may include functionality or a tool to define and create color synchronization controls that can be bound to (i.e., associated with) a story to define and control the color of graphic visualizations in a story. In some embodiments, applications 110 may be configured to facilitate, support, and execute a program to specify the colors of dimensions included in graphic visualizations (also referred to herein as charts and simply, visualizations). The color synchronization controls created and processed herein may be implemented by an application. The application may be stored in a persistent memory, where it can be accessed for a future use, including being bound to one or more visualizations in the context of a story and used to generate the visualizations bound thereto such that the same dimensions are rendered with the same color across all visualizations in a same story.

As used herein, a story refers to a collection, set, or other associated grouping of one or more visualizations that may share one or more characteristics or relationships. In general, a story may include multiple pages and each page may include one or more visualizations (e.g., the multiple visualizations may each relate to a common organization, the multiple visualizations may each reference a common database, a common product line, etc.). The functionality or tool that may be implemented by one of applications 110 may be device agnostic, working across different devices and technologies.

System 100 includes a color synchronization service or server 115. In some embodiments, a functionality or service for creating and editing of color synchronization controls may be deployed as a cloud-based service, whereas in some other embodiments system 100 may include a client-server architecture. System 100 may encompass both scenarios. In the instance system 100 includes a server at 115, the devices at 105 may be client devices running applications as discussed above. In an instance system includes a cloud-based server at 115, the devices at 105 may execute a browser that is used by a user to interface with service 115.

System 100 further includes a backend system that can generate, automatically, in response to a request or call from color synchronization service 115, executable code or instructions to perform a process to create and/or support the creation of color synchronization controls and visualizations managed, at least in part, thereby. In some aspects herein, a user may provide an indication or request the rendering of one or more visualizations, as implemented in an application 110 and/or server or service 115, which may operate in cooperation with the processing of a backend system 120 to generate a program or response to effectuate the color synchronization control that may be used in rendering the requested visualizations where like dimensions have the same color renderings.

In one example, a client 105 executes an application 110 to present one or more visualizations via a user interface (UI) to a user on a display of client 105. The user manipulates UI elements within the UI to indicate and specify a visualization and/or dimensions to include in a desired visualization, where a server or service 115 embodying the color synchronization control operates, in cooperation with backend system 120 and database 125 to generate, for example, a color synchronization map (or other data structure) that might be used in managing the colors assigned to dimensions in the requested visualizations to be rendered.

Data store 125 may comprise any data source or sources that are now known or become known. Data store 125 may comprise a relational database, a HTML document, an eXtendable Markup Language (XML) document, or any other data storage system storing structured and/or unstructured data files. The data of data store 125 may be distributed among several data sources. Embodiments are not limited to any number or types of data sources.

Data store 125 may implement an "in-memory" database, where a full database is stored in volatile (e.g., non-disk-based) memory (e.g., Random Access Memory). The full database may be persisted in and/or backed up to fixed disks (not shown). Embodiments herein are not limited to an in-memory implementation. For example, data may be stored in Random Access Memory (e.g., cache memory for storing recently-used data) and other forms of solid state memory and/or one or more fixed disks (e.g., persistent memory for storing their respective portions of the full database).

In accordance with some aspects of the present disclosure, color synchronization across a story herein provides a mechanism and environment that supports consumers of visualizations to more easily compare different charts in a story by automatically coloring the same dimension members with the same color in all charts in the story.

In some embodiments, chart coloring for the same dimension member (including VERSION from planning models) combination is automatically synchronized across different charts and newly created charts will have their color matched to existing colors if their dimensions' members match exiting dimensions.

In some embodiments, a user (or other entity) may be able to disable a color synchronization feature(s) for individual charts by specifically and selectively invoking a control. In some other embodiments, a user (or other entity) may be able assign a specific color to a specific dimension that can be synced and honored by other visualizations in a story.

In order to keep colors synchronized across different visualizations (e.g., charts) for different work flows, some embodiments herein employ a centralized chart coloring map. The coloring or color map can be saved within a story model to retain all of the color sync information. The color map may store the data source(s) of a chart, dimension combinations, color palette, dimension value to color, and next available color. In some embodiments, these properties might be configured in the following format:

chartColoringMap [datasources] [dimensionString]
      colorPalette
      colors
      dimensionValue2Color
      nextAvailableColorIndex In some embodiments herein, a synchronization of colors among all visualizations in a story will occur at the story level. In some aspects, each visualization independently queries for its own data (e.g., on a backend system) and invokes a chart color manager instantiated at the story level. As each visualization loads, it queries the color manager for the current color mapping, updates the color mapping if necessary, and uses the current mapping to determine its own colors. This sequence of events is possible assuming a first-write-wins policy and a single-threaded environment. In some regards, this type of sequential building of the color mapping removes the need for costly re-draws, which may also detract from a pleasurable user experience.

In one scenario, a single property is stored in the story model, for an initial implementation, to determine whether color synchronization is "on" and what dimension it is based on. In a subsequent implementation, users might be able to specify colors for specific dimension values. At that point, both dimensions, values, and colors can be stored in the story model. In either case, the model data will be passed down as part of the visualization definition into a (logical) charting layer. A color processor may then be used to populate the appropriate color information into each data point for rendering.

Figure 2:
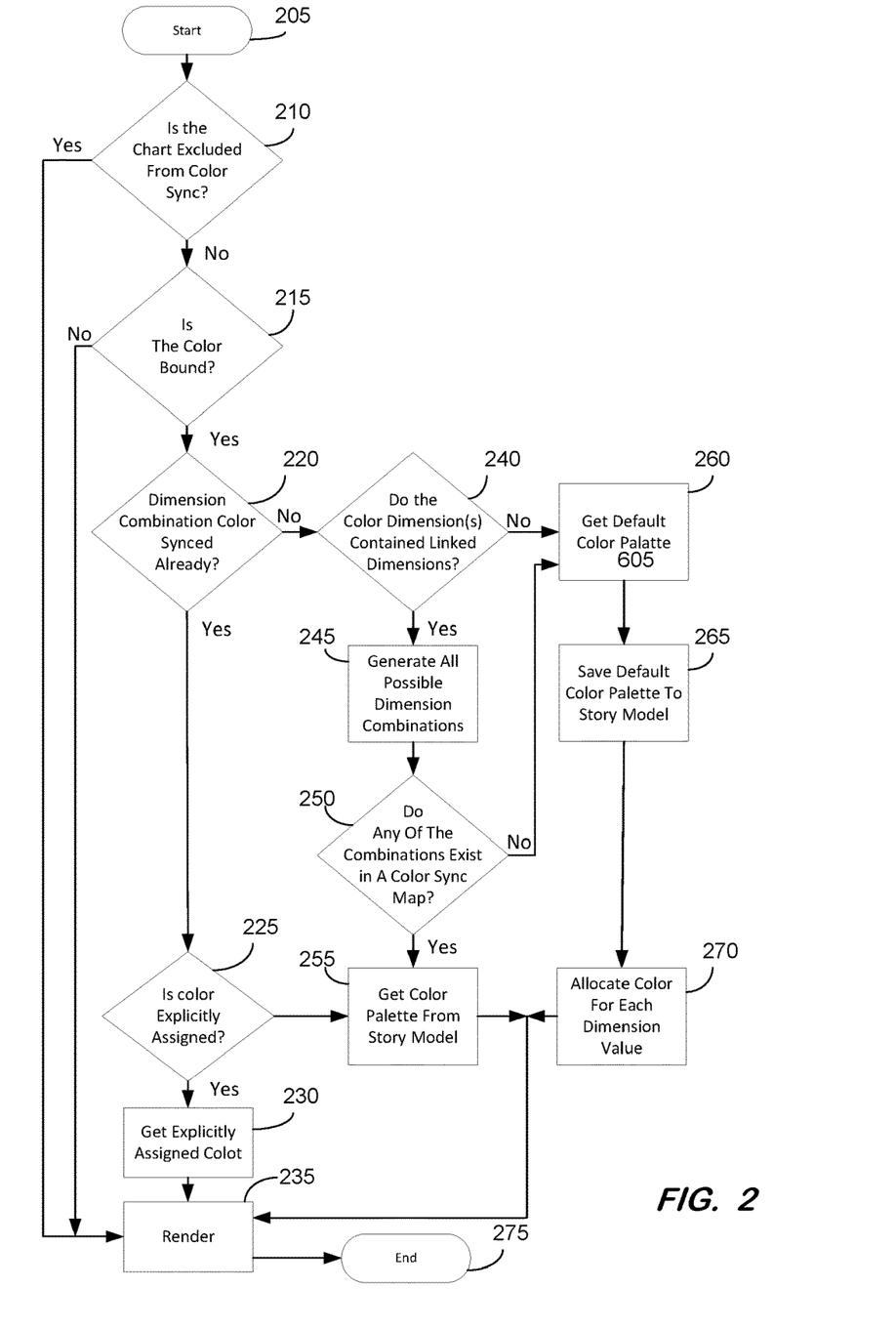
FIG. 2 is an example flow diagram of a process.

FIG. 2 is an illustrative flow diagram of an example process, according to some embodiments herein. Process 200 may start at 205 and might include one or more steps, operations, tasks, and other "pre-processing" activities that while not specifically called out in FIG. 2 might be performed by one or more systems, devices, services, and other entities in preparation of process 200 so that those same or other entities might execute the operations of process 200. For example, process 200 may be invoked in response to an end-user's request for a visualization (i.e., chart). The request may be generated in reply to a user's interaction with an application or system via a user interface (UI). At operation 210, a determination is made whether the visualization is excluded from a color synchronization process, such as process 200. If the visualization to be rendered is excluded from the color synchronization features of process 200, then process 200 proceeds to render the requested visualization based on the data and properties of the visualization, and in some instances, the renderer being used. In an instance the visualization is subject to the color synchronization of process 200, then a determination is made at operation 215 of whether the color of the visualization is bound or otherwise constrained to being determined or assigned by the color synchronization control(s) of process 200.

If the visualization is not bound as determined at operation 215, then the process advances to 235 where it can be rendered in accordance with the data and properties of the visualization, and in some instances, the renderer being used. If the visualization is bound as determined at operation 215, then the process flows to operation 220 where a determination is made concerning whether a dimension combination of the visualization is already color synchronized to one or more other dimensions whose color is already set by a color synchronization process (e.g., an automatic colorization process, a manual process, and combinations thereof). If the dimension combination of the visualization is already color synchronized to one or more other dimensions, is the color explicitly assigned to the visualization? That is, for example, has the end-user (or some other entity) expressly set the color of the dimension combination to a specific for one or more reasons (e.g., personal preference, a compliance requirement, etc.)? If the color has been explicitly assigned, then that assignment is respected and the explicit color is obtained at operation 230 and the visualization is rendered using the explicit color assignment at operation 235.

If at operation 225 it is determined that the color is not explicitly assigned, then the color for the visualization must be determined. Advancing to operation 255 from operation 225, the color for the dimension of the visualization will be obtained from a color palette of the story to which the visualization is a part of. In this manner, the color of all such dimensions will be selected from the color palette of the story to which the visualization belongs.

Returning to decision-point 220, where the determination is made as to whether the dimension combination of the visualization is already color synchronized to one or more other dimensions, a further determination is made at 240 regarding whether the subject dimension(s) contain linked dimension(s). As used herein, a linked dimension is a dimension that is associated with at least one other dimension by a shared relationship of one or more properties. If the subject dimension(s) contain linked dimension(s) at 24, then operations 245 and 250 are executed. Otherwise, process proceeds to operation 260 from 240. At operation 245, all possible dimension combinations for the subject visualization are generated and they are examined at 250 to determine whether any of the dimension combinations exist in a color synchronization map of the story. If at least one of the dimension combinations exists in a color synchronization map of the story, then the color palette of the story will dictate the color for all of the dimensions of the visualization and as such, the colors for the visualization will be obtained from the color palette of the story model.

If none of the dimension combinations are associated with an existing color synchronization map of the story, then a default color palette is obtained or generated at 260 and that default color palette is saved model at operation 265. The colors for the dimensions that are to be obtained from a default color palette at 265 may be allocated for each dimension value at operation 270. Operation 270 maybe accomplished in one or more variety of ways. One particular way of allocating the colors to the dimensions based on a palette will be described below in reference to FIG. 4.

From operations 255 and 270, process 200 continues to operation 235 where the visualization including the dimensions therein can be rendered based on the existing color palette of the story (i.e., from 255) or a based on colors allocated to a default color palette (i.e., from 265). Upon rendering the visualization at operation 235, the color synchronization process of FIG. 2 may terminate at operation 275.

Figure 3:
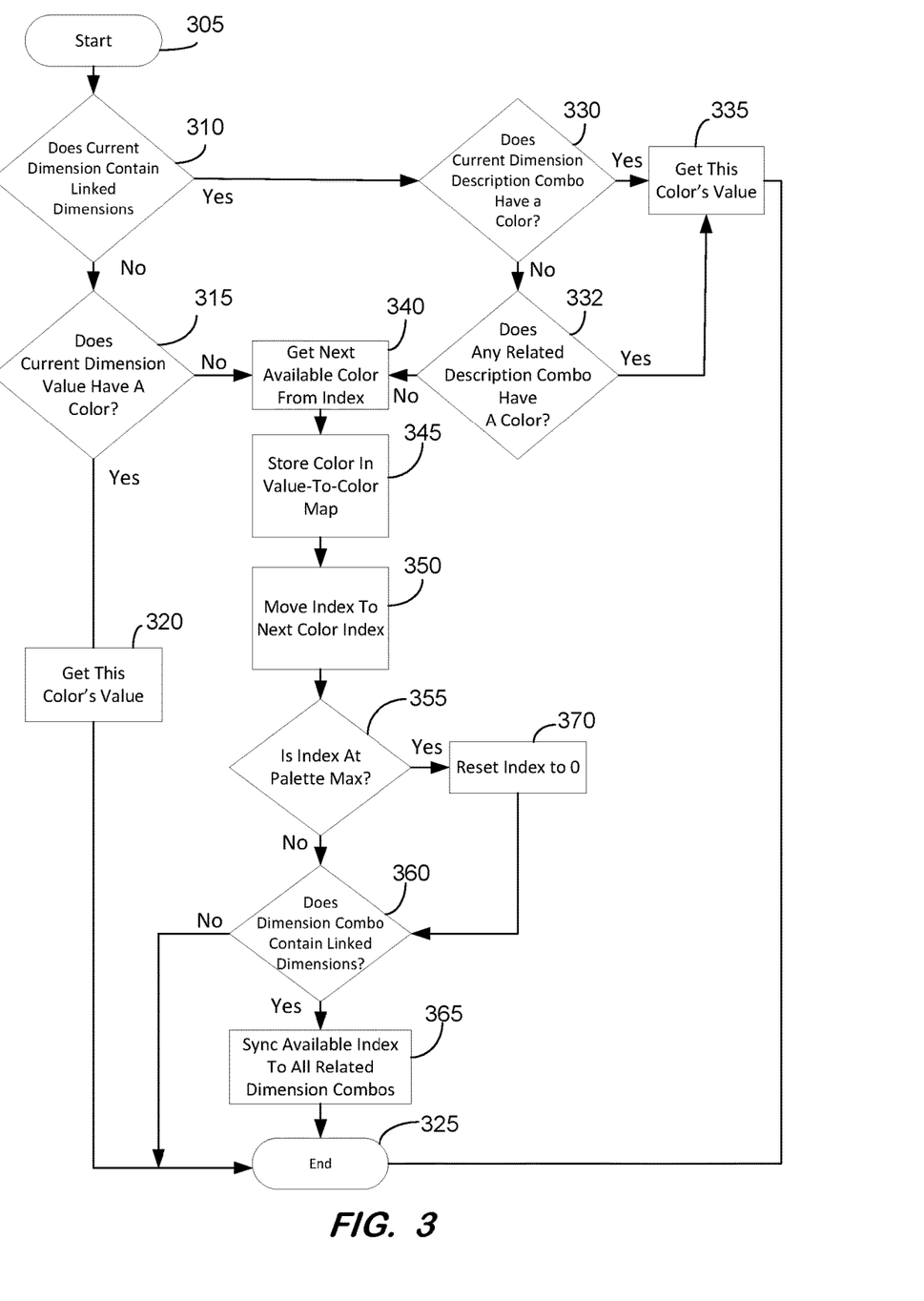
FIG. 3 is an example flow diagram of some aspects of a process.

FIG. 3 is an example of a process 300 relating to some aspects of color synchronization amongst a plurality of visualizations belonging to a same story. In particular, process 300 may relate to an allocation process or method, such as operation 270 in FIG. 2. As introduced above, the allocation process of operation 270 may provide a mechanism to assign a particular color to dimensions in a visualization to be rendered for consumption. Process 300 is initiated at 305, which might, in some embodiments, correspond to operation 265 of FIG. 2, although this is not a prerequisite in all scenarios herein. At operation 310, a determination is made whether the subject dimensions being evaluated in an executing instance of process 300 are linked to any other dimensions. This operation is performed since, in some embodiments as illustrated by FIG. 2, the dimensions under consideration may or may not be linked dimensions. Given the relational interconnects that may exist between linked dimensions, the allocation of colors to linked and unlinked dimensions may vary.

In an instance the current dimensions under consideration do not contain a linked dimension, the process continues to operation 315 from operation 310 where the current dimension is evaluated to verify whether there is a color associated with the dimension. If there is a color associated therewith, then process 300 continues to operation 320 and the associated color is obtained for the dimension to conclude the color allocation process for the subject dimension. However, if there is no color associated with the dimension under consideration at 315, then flow 300 continues to operation 340 where a next available color from an index is chosen for the subject dimension and the associated color is stored in a dimension value-to-color map (i.e., a color map). At operation 350, a mechanism or technique to associate different colors with distinct, non-linked dimensions may be provided by changing the index to a next value (e.g., increase the index by 1). In the example of FIG. 3, each color in a palette of set of colors may be associated with a unique index number. At operation 355, the new index value is checked to confirm if it is out of range of the palette of colors. If so, then the index can be reset to zero (0), as shown at operation 370. At operation 360, the dimension combination is reviewed for containing linked dimensions. If there are linked dimensions, then current index' color is synchronized to all of the related (i.e., linked) dimensions' combinations. Having synced dimensions to colors, the allocation process concludes after 365 at operation 325.

Returning to operation 310, process 300 continues to operation 330 in response to the current dimensions being determined, at operation 310, to include linked dimensions. At operation 330, if the description for the current dimension includes a specified color, then that color is obtained at 335 and allocated for the dimension combination. If, at operation 330, the description for the current dimension does not include a color, then it is determined at 332 whether any of the related (i.e., linked) dimensions include a specified color. If so, then that specific color is obtained at 335 and allocated for the dimension combination. Otherwise, process 300 proceeds from operation 332 to operation 340 and process 300 continues as described above.

Figure 4:
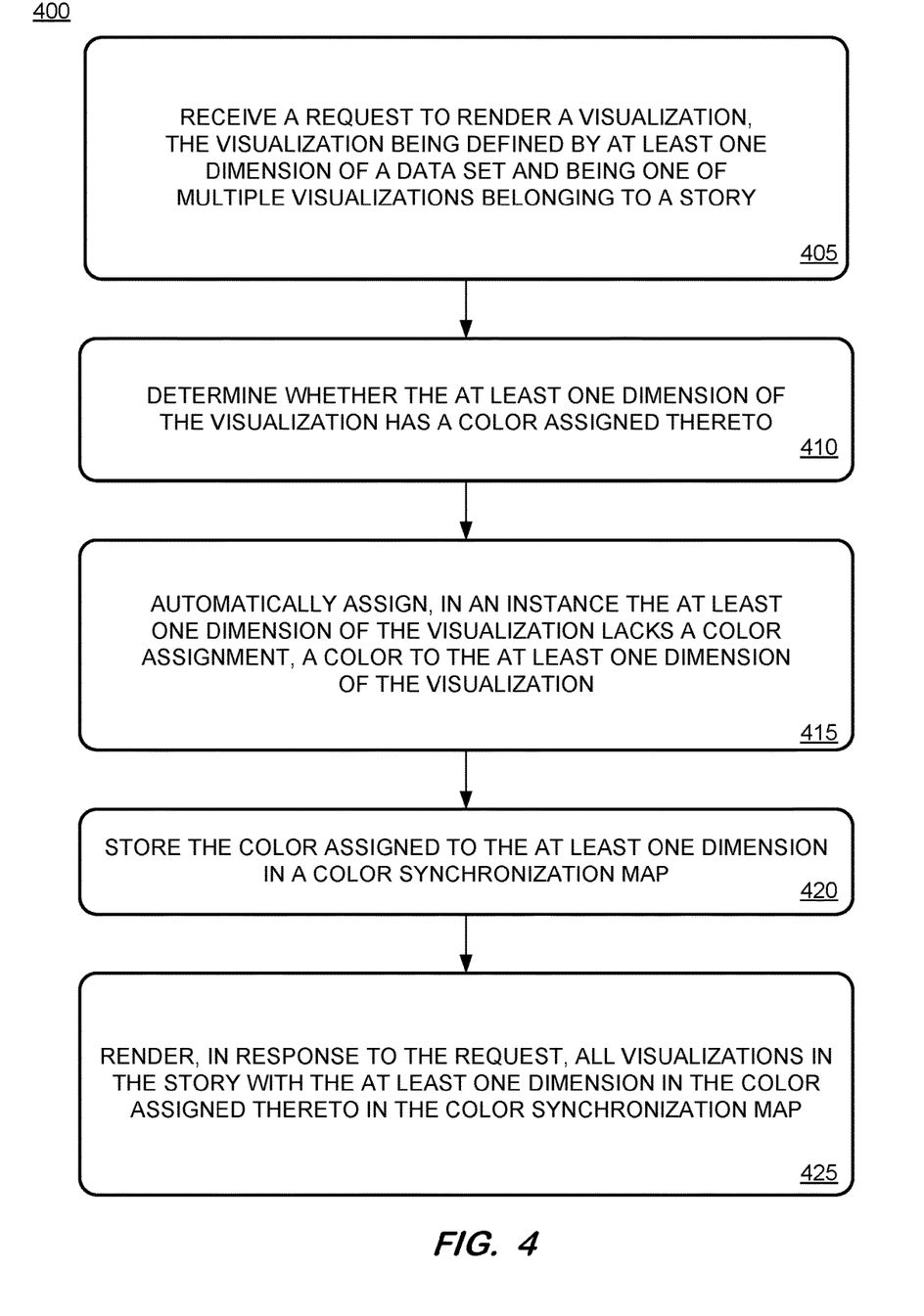
FIG. 4 is another example flow diagram of a process.

FIG. 4 is a flow diagram relating to some aspects of an embodiment herein. FIG. 4 may relate to a process for color synchronization herein. In some embodiments, the operations, steps, or executable tasks of process 400 may be performed in some instances alone or in conjunction with other operations, including more, fewer, and alternative operations to those shown in FIG. 4.

Regarding the example of FIG. 4, a request to render a visualization is received at operation 405. The request might be received from a consumer of the visualization, either explicitly and directly where a user requests a specific visualization including specific dimensions or indirectly such as when a user initiates a request for a report regarding one or more aspects of an organization's operations using natural language. With regards to FIG. 4, the visualization to be rendered is defined by at least one dimension of a data set and is further one of multiple visualizations in a story including the visualization to be rendered.

At operation 410, a determination is made as to whether the at least one dimension of the visualization to be rendered has a color assigned thereto. In some instances where a color is not yet assigned to the dimension, process 400 operates to automatically assign a color to the at least one dimension of the visual to be rendered, as shown at operation 415.

In some instances where there is a color already assigned to the dimension at 410 (e.g., an entity has manually assigned a color to the dimension), such color assignments might preclude further consideration by a color synchronization process herein other than adhering to the already assigned color for the dimension(s).

The color automatically assigned at operation 415 may be stored in a color synchronization map in a persistent data storage facility or medium at operation 420. In this manner, the stored color assignment may be referenced for future use to assign other dimensions of the same value the same color and to assign linked dimensions the same color.

Operation 425 may encompass any method, technique, and procedure to render the requested visualization. In particular, the visualization of FIG. 4 is performed to render all visualization in the story with the at least one dimension in the color assigned thereto in the color synchronization map.

Color synchronization of linked dimension(s) may require matching a dimension with another dimension to which it is linked to in a different model. This constraint dictates the way a coloring map is used since, for example, instead of performing an explicit matching of a dataset and dimension string, color assignments of a completely different dataset and dimension string combination may be used for color synchronization of linked dimensions. Linked dimensions may introduce a number of complexities or challenges. In some embodiments, a dimension could be indirectly linked with another. For example, Dataset1 includes Dimension1 and it is linked to Dimension2 from Dataset2, and Dataset2's Dimension2 is also linked to Dataset3's Dimension3. In this example, if a chart is created with Dataset1 and Dimension1 when there is already an existing chart based on Dataset3 and Dimension3, then the color previously assigned to Dimension3 should also be assigned (i.e., synced) to Dimension1 in the newly created chart.

In some embodiments, two linked dimension members from two datasets can have different IDs even though they have the same description.

In some embodiments, datasets do not have to match exactly in order to have matching dimension members. As an example, Chart A is based on Dataset1's Dimension1 and Dimension2; Chart B is based on Dataset2's Dimension1' and Dataset1's Dimension2; and Dimension1 and Dimension1' are linked to each other. Therefore, Chart A has one dataset and Chart B has two datasets, but their colors should be synchronized to each other.

Figure 5:
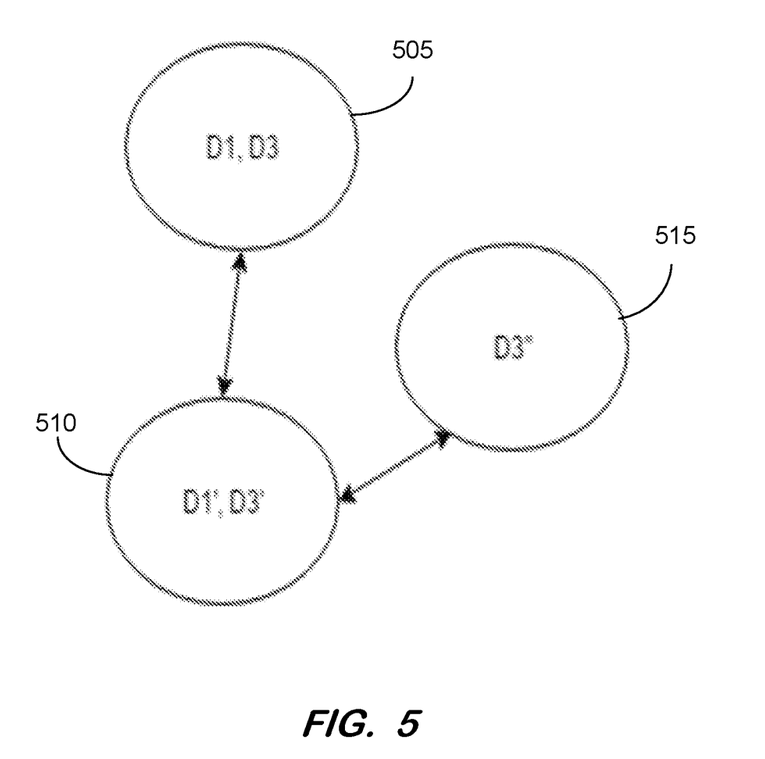
FIG. 5 is an example of a linked graph.

FIG. 5 is an illustrative depiction of a linked graph 500 including specific dimension combinations. The dimension combinations may correspond to graphical charts in a visualization. For example, a first chart may include the 505 dimension combination of D1 and D3, a second chart may include the 510 dimension combination of D1' and D3', while a third chart simply includes dimension D3".

Figure 6:
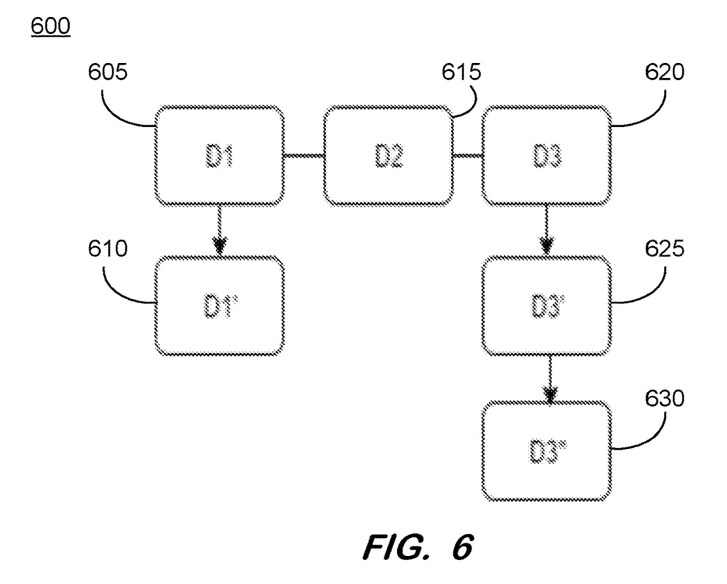
FIG. 6 is an example of a dimension map.

FIG. 6 is an illustrative dimension map 600 that might correspond to the linked graph of FIG. 5. In the current example, all of the relationships between the dimensions of the visualization are shown in FIG. 6. As shown, for example, D1 is directly linked to D1' and D2, and indirectly linked to D3. Additional linked relationships are further seen. The totality of the linked dimensions represents all of the possible combinations of dimensions, in the current illustrative example.

Figure 7:
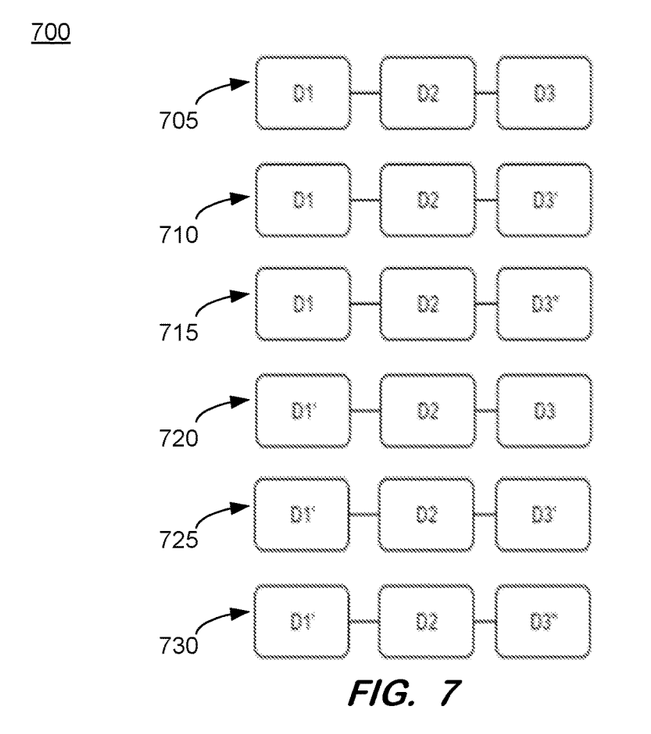
FIG. 7 is an example listing of combinations of dimensions.

FIG. 7 is an illustrative depiction of a listing of all of the possible dimension combinations of FIGS. 5 and 6. The listing of all possible dimension combinations as shown in FIG. 7 (or some other construct or data structure including the same or similar information) may be traversed to determine what additional dimensions, if any, can be matched to colors already specified in a color map (i.e., a color control map, a color management map, or some other mechanism). The thus matched dimensions may be color synchronized, in accordance with other aspects of the present disclosure.

In some embodiments, in a task or process of "matching" dimension members to each other, a verification can be performed to check whether a primary data set might be contained within an alternative data set. This type of check may be beneficial in an instance different data sets do not match exactly and yet they can have matching dimension members. For example, Chart A is based on Data Set1 and its Dimension1 and Dimension2; and Chart B is based on a Data Set2's Dimension1' and Data Set1's Dimension 2, where Dimension1 and Dimension2 are linked to each other. Accordingly, Chart A has one Data Set and Chart B has two Data Sets. However, the colors for Chart A and Chart B should still be synchronized.

Figure 8:
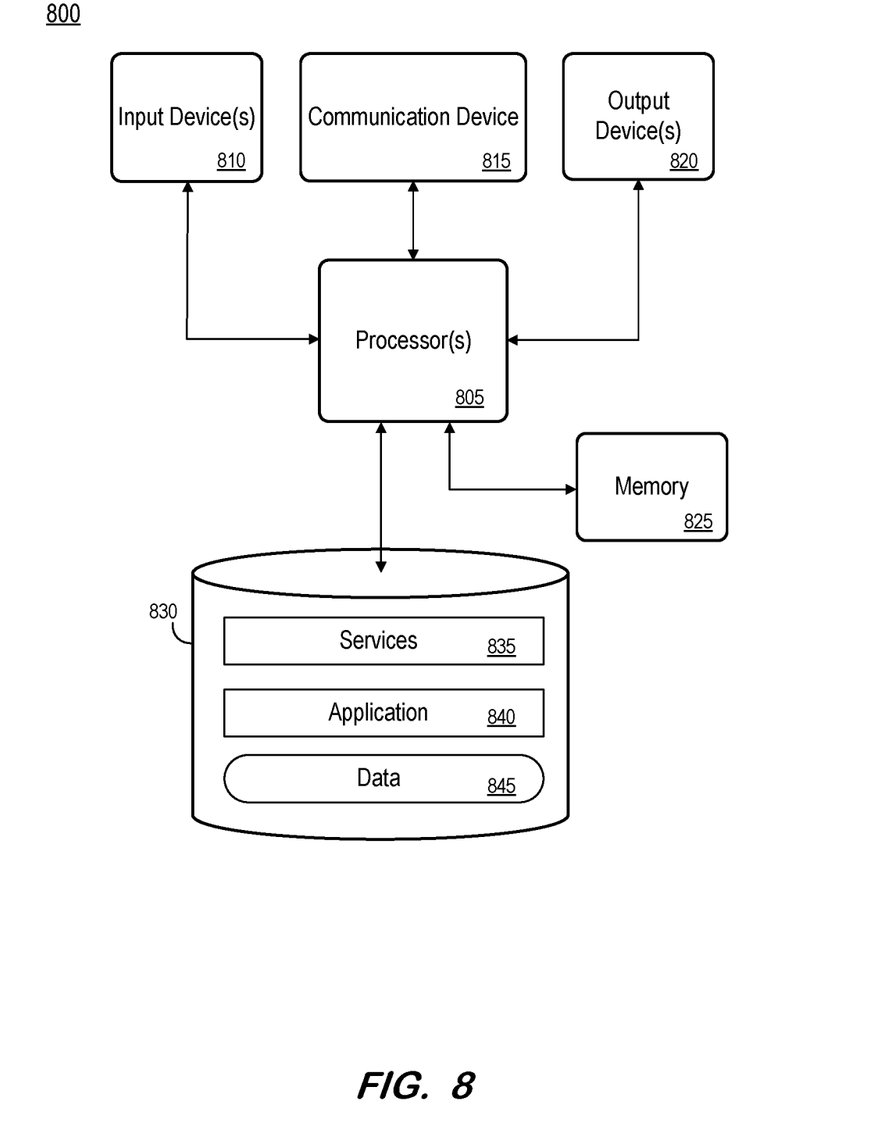
FIG. 8 is a block diagram of an apparatus, according to some embodiments.

Apparatus 800 includes processor 805 operatively coupled to communication device 820, data storage device 830, one or more input devices 810, one or more output devices 820 and memory 825. Communication device 815 may facilitate communication with external devices, such as a reporting client, or a data storage device. Input device(s) 810 may comprise, for example, a keyboard, a keypad, a mouse or other pointing device, a microphone, knob or a switch, an infra-red (IR) port, a docking station, and/or a touch screen. Input device(s) 810 may be used, for example, to enter information into apparatus 800. Output device(s) 820 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 825 may comprise Random Access Memory (RAM), Storage Class Memory (SCM) or any other fast-access memory.

Services 835 and application 840 may comprise program code executed by processor 805 to cause apparatus 800 to perform any one or more of the processes described herein (e.g., FIGS. 2, 3, and 4). Embodiments are not limited to execution of these processes by a single apparatus.

Data 845 (either cached or a full database) may be stored in volatile memory such as memory 825. Data storage device 830 may also store data and other program code and instructions for providing additional functionality and/or which are necessary for operation of apparatus 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable instructions; and
a processor to execute the processor-executable instructions to cause the system to:
 receive a request to render a visualization, the visualization being defined by at least one dimension of a data set and being one of multiple visualizations belonging to a story;
 determine whether the at least one dimension of the visualization has a color assigned thereto;
 automatically assign, in an instance the at least one dimension of the visualization lacks a color assignment, a color to the at least one dimension of the visualization;
 store the color assigned to the at least one dimension in a color synchronization map;
 determine that the color of the at least one dimension is already having its color managed by a color synchronization map;
 determine whether the color for the at least one dimension is explicitly assigned thereto;
 obtain, in an instance the color is determined to be explicitly assigned to the at least one dimension, the explicitly assigned color;
 render all of the visualizations in the story with the at least one dimension in the color explicitly assigned thereto; and
 render, in response to the request, all visualizations in the story with the at least one dimension in the color assigned thereto in the color synchronization map.

2. The system of claim 1, wherein the processor is further enabled to execute the processor-executable instructions to cause the system to determine whether the at least one visualization is excluded from having its color managed by a color synchronization map.

3. The system of claim 1, wherein the processor is further enabled to execute the processor-executable instructions to cause the system to:
 obtain, in an instance the color is determined not to be explicitly assigned to the at least one dimension, the color for the at least one dimension from a data model of a story including the visualization; and
 render all of the visualizations in the story with the at least one dimension in accordance with the data model.

4. The system of claim 1, wherein the processor is further enabled to execute the processor-executable instructions to cause the system to:
 determine whether the at least one dimension is linked to another dimension;
 generate, in an instance it is determined that the at least one dimension is linked to another dimension, all possible dimension combinations for the visualization; and
 determine whether any of the possible dimension combinations exist in a color synchronization map for the visualization.

5. The system of claim 4, wherein the processor is further enabled to execute the processor-executable instructions to cause the system to:
 obtain, in an instance it is determined at least some of the possible dimensions exist in the color synchronization map for the visualization, the color for the at least one dimension from a data model of a story including the visualization; and
 render all of the visualizations in the story with the at least one dimension in accordance with the data model.

6. The system of claim 4, wherein the processor is further enabled to execute the processor-executable instructions to cause the system to:
 obtain, in an instance it is determined none of the possible dimensions exist in the color synchronization map for the visualization, a default color palette for the visualization;
 store the default color palette to a data model for a story including the visualization;
 allocate a color for each of the at least one dimensions; and
 render all of the visualizations in the story with the at least one dimension in the color allotted thereto.

7. The system of claim 6, wherein the processor is further enabled to, for the allocating of a color for each of the at least one dimensions, execute the processor-executable instructions to cause the system to:
 determine whether the at least one dimension contains at least one linked dimension;
 obtain, for the linked dimensions having a color assigned thereto, the assigned color, the assigned color being assigned directly or indirectly to the linked dimensions;
 determine, in an instance the at least one dimension is a non-linked dimension, whether the non-linked dimension has a color assigned thereto;
 obtain, for the non-linked dimension having a color assigned thereto, the assigned color, the assigned color; and
 obtain, for the non-linked dimension not having a color assigned thereto, a next color from an index of the story.

8. A non-transitory computer-readable medium storing program instructions executable by a processor of a computing system, the medium comprising:
 instructions to receive a request to render a visualization, the visualization being defined by at least one dimension of a data set and being one of multiple visualizations belonging to a story;
 instructions to determine whether the at least one dimension of the visualization has a color assigned thereto;
 instructions to automatically assign, in an instance the at least one dimension of the visualization lacks a color assignment, a color to the at least one dimension of the visualization;
 instructions to store the color assigned to the at least one dimension in a color synchronization map;
 instructions to determine that the color of the at least one dimension is already having its color managed by a color synchronization map;

instructions to determine whether the color for the at least one dimension is explicitly assigned thereto; and instructions to obtain, in an instance the color is determined to be explicitly assigned to the at least one dimension, the explicitly assigned color; and instructions to render all of the visualizations in the story with the at least one dimension in the color explicitly assigned thereto; and instructions to render, in response to the request, all visualizations in the story with the at least one dimension in the color assigned thereto in the color synchronization map.

9. The medium of claim 8, further comprising instructions to determine whether the at least one visualization is excluded from having its color managed by a color synchronization map.

10. The medium of claim 8, further comprising:
instructions to obtain, in an instance the color is determined not to be explicitly assigned to the at least one dimension, the color for the at least one dimension from a data model of a story including the visualization; and
instructions to render all of the visualizations in the story with the at least one dimension in accordance with the data model.

11. The medium of claim 8, further comprising:
instructions to determine whether the at least one dimension is linked to another dimension;
instructions to generate, in an instance it is determined that the at least one dimension is linked to another dimension, all possible dimension combinations for the visualization; and
instructions to determine whether any of the possible dimension combinations exist in a color synchronization map for the visualization.

12. The medium of claim 11, further comprising:
instructions to obtain, in an instance it is determined at least some of the possible dimensions exist in the color synchronization map for the visualization, the color for the at least one dimension from a data model of a story including the visualization; and
instructions to render all of the visualizations in the story with the at least one dimension in accordance with the data model.

13. The medium of claim 11, further comprising:
instructions to obtain, in an instance it is determined none of the possible dimensions exist in the color synchronization map for the visualization, a default color palette for the visualization;
instructions to store the default color palette to a data model for a story including the visualization;
instructions to allocate a color for each of the at least one dimensions; and
instructions to render all of the visualizations in the story with the at least one dimension in the color allotted thereto.

14. The medium of claim 13, further comprising, for the allocating of a color for each of the at least one dimensions:
instructions to determine whether the at least one dimension contains at least one linked dimension;

instructions to obtain, for the linked dimensions having a color assigned thereto, the assigned color, the assigned color being assigned directly or indirectly to the linked dimensions;

instructions to determine, in an instance the at least one dimension is a non-linked dimension, whether the non-linked dimension has a color assigned thereto;

instructions to obtain, for the non-linked dimension having a color assigned thereto, the assigned color, the assigned color; and instructions to obtain, for the non-linked dimension not having a color assigned thereto, a next color from an index of the story.

15. A method comprising:
receiving, by a processor, a request to render a visualization, the visualization being defined by at least one dimension of a data set and being one of multiple visualizations belonging to a story;
determining, by the processor, whether the at least one dimension of the visualization has a color assigned thereto;
automatically assigning, by the processor, in an instance the at least one dimension of the visualization lacks a color assignment, a color to the at least one dimension of the visualization;
storing the color assigned to the at least one dimension in a color synchronization map;
determining that the color of the at least one dimension is already having its color managed by a color synchronization map;
determining whether the color for the at least one dimension is explicitly assigned thereto; and
obtaining, in an instance the color is determined to be explicitly assigned to the at least one dimension, the explicitly assigned color; and
rendering all of the visualizations in the story with the at least one dimension in the color explicitly assigned thereto; and
rendering, by the processor, in response to the request, all visualizations in the story with the at least one dimension in the color assigned thereto in the color synchronization map.

16. The method of claim 15, further comprising:
obtaining, in an instance the color is determined not to be explicitly assigned to the at least one dimension, the color for the at least one dimension from a data model of a story including the visualization; and
rendering all of the visualizations in the story with the at least one dimension in accordance with the data model.

17. The method of claim 15, further comprising:
determining whether the at least one dimension is linked to another dimension;
generating, in an instance it is determined that the at least one dimension is linked to another dimension, all possible dimension combinations for the visualization; and
determining whether any of the possible dimension combinations exist in a color synchronization map for the visualization.

* * * * *